(12) United States Patent
Kilbey et al.

(10) Patent No.: US 11,751,553 B2
(45) Date of Patent: Sep. 12, 2023

(54) ANIMAL HOOF THERAPEUTIC DELIVERY WRAP

(71) Applicants: Bryan E. Kilbey, DeFuniak Springs, FL (US); Julie Williams, Sonoma, CA (US)

(72) Inventors: Bryan E. Kilbey, DeFuniak Springs, FL (US); Julie Williams, Sonoma, CA (US)

( * ) Notice: Subject to any disclaimer, the term of this patent is extended or adjusted under 35 U.S.C. 154(b) by 0 days.

(21) Appl. No.: 17/354,070

(22) Filed: Jun. 22, 2021

(65) Prior Publication Data

US 2021/0307310 A1    Oct. 7, 2021

Related U.S. Application Data

(63) Continuation of application No. 14/866,057, filed on Sep. 25, 2015, now abandoned.

(51) Int. Cl.
| | |
|---|---|
| *A01L 15/00* | (2006.01) |
| *A01K 13/00* | (2006.01) |
| *A61D 9/00* | (2006.01) |
| *A61D 7/00* | (2006.01) |

(52) U.S. Cl.
CPC ............ *A01L 15/00* (2013.01); *A01K 13/007* (2013.01); *A61D 7/00* (2013.01); *A61D 9/00* (2013.01)

(58) Field of Classification Search
CPC ..... A01L 15/00; A01K 13/006; A01K 13/007; A61D 7/00; A61D 9/00
See application file for complete search history.

(56) References Cited

U.S. PATENT DOCUMENTS

| | | | | |
|---|---|---|---|---|
| 5,152,285 A | * | 10/1992 | Gnegy | A61F 7/02 607/108 |
| 5,224,549 A | * | 7/1993 | Lightner | A01K 13/007 54/82 |
| 5,363,632 A | * | 11/1994 | Armato | A01K 13/007 54/82 |
| 5,408,812 A | * | 4/1995 | Stark | A01K 13/007 54/82 |
| 5,871,458 A | * | 2/1999 | Detty | A01K 13/007 607/108 |
| 5,910,126 A | * | 6/1999 | Wilson | A01K 13/007 602/62 |

(Continued)

FOREIGN PATENT DOCUMENTS

| | | | | |
|---|---|---|---|---|
| AU | 2010100541 A4 | * | 7/2010 | ........... A01K 13/007 |
| WO | WO-2014057285 A1 | * | 4/2014 | ........... A01K 13/007 |

*Primary Examiner* — Joshua J Michener
*Assistant Examiner* — Nicole Paige MacCrate
(74) *Attorney, Agent, or Firm* — J. Wiley Horton

(57) ABSTRACT

A modular lower leg and hoof wrap configured to hold one or more therapeutic devices proximate an animal's hoof. The invention is intended primarily for use with horses. The components attach to a sole, which is intended to be positioned beneath the animal's hoof. One or more retention panels extend upward from the sole. A first wrap panel and a second wrap panel also extend upward form the sole. Elastic and VELCRO attachment features are preferably used so that each of the components may be positioned in a suitable location for a particular animal's anatomy. Other closure devices, such as buckles or snaps, could also be used.

20 Claims, 11 Drawing Sheets

(56) References Cited

U.S. PATENT DOCUMENTS

| | | | |
|---|---|---|---|
| 6,526,920 B1 * | 3/2003 | Griffin | A01K 13/007 54/82 |
| 7,677,206 B1 * | 3/2010 | Southworth | A01K 13/007 36/111 |
| D643,579 S * | 8/2011 | Hall | D30/146 |
| 8,664,466 B2 * | 3/2014 | Tilghman | A61L 15/26 602/58 |
| 9,055,732 B1 * | 6/2015 | Ruetenik | A01K 13/007 |
| 10,342,226 B1 * | 7/2019 | Ford | A01L 3/02 |
| 11,000,011 B2 * | 5/2021 | Coder | B68C 5/00 |
| 2004/0031246 A1 * | 2/2004 | Springs | A01K 13/007 54/82 |
| 2016/0227739 A1 * | 8/2016 | Yang | A01K 13/007 |
| 2019/0335711 A1 * | 11/2019 | Blizzard | A01K 15/02 |

* cited by examiner

ANIMAL HOOF THERAPEUTIC DELIVERY WRAP

CROSS-REFERENCES TO RELATED APPLICATIONS

This application is a continuation of U.S. patent application Ser. No. 14/866,057.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of medical products. More specifically, the invention comprises a modular wrap configured to hold one or more therapeutic devices around an animal's lower leg and hoof.

2. Description of the Related Art

One of the present invention's primary uses is the treatment of diseases and other conditions in the lower legs and hooves of hoofed animals such as horses. Although the invention may be potentially applied to many different animals, this disclosure uses horses in its descriptions. The bones of a horse's hoof are suspended within the hoof by layers ("laminae") of modified skin cells. These layers are tightly interwoven and connected together by a matrix of collagen proteins. The combination of the layers and the matrix of linking materials create a sort of shock absorber during motion. Several hundred pairs of interleaved laminae link the relatively rigid hoof wall with the "coffin bone" (the third phalanx) of the horse's lower leg structure. The entire load of a horse's leg must be transmitted through these connections.

The rigid hoof wall has a solid anterior wall that bends smoothly into a right lateral wall and a left lateral wall. The bottom portion of this wall actually bears the weight of the horse against the ground. The lowest forward portion is sometimes called the "toe" (though this portion is not distinct from the rest of the hoof wall and just represents the lowest portion of the wall). The sole of the hoof is the softer portion of the downward-facing structures lying inside the perimeter of the hoof wall. A complex relieved structure near the rear of the hoof is commonly known as the "frog."

The hoof structure extends upward from the ground-contacting portion and is generally viewed as stopping at the "coronary band." The coronary band is the region where the hard hoof material emerges from the softer flesh of the leg. It is the region where the hoof material ends and the horse's hide begins.

Horses generally do not lie down and instead remain standing even while sleeping. Thus, the hooves bear the animal's weight continuously for most of its life. They are obviously a critical structure, and diseases affecting the hoofs integrity are serious. Various therapeutic devices are used to treat diseases affecting the hoof. These include (without limitation): (1) cold packs, (2) hot packs, (3) medication packs configured to slowly administer a specified medication, (4) ultrasonic devices, (5) magnetic devices, and (6) light-based devices.

While an explanation of the various conditions affecting a horse's hoof and lower leg is beyond the scope of this disclosure, it may benefit the reader to understand the details of an exemplary common condition. Laminitis is a common problem in horses. This condition compromises the linkages between the hoof wall and the coffin bone, producing inflammation and significant pain. Depending upon the severity of the disease, the coffin bone may begin to rotate and/or sink relative to the hoof wall. Once the coffin bone's position changes significantly the laminae may visibly separate. A horse in this state of distress is traditionally said to "founder." It is possible for a horse in this condition to recover with aggressive treatment, but the mortality rate is high.

Laminitis is often caused by a condition existing elsewhere in the horse (examples being carbohydrate overload in the digestive system, colic, and untreated infections). The root cause is often treatable. However, the existence of the condition threatens to break down the hoof s structure and the integrity of the hoof must be maintained while the root cause is addressed.

A common symptom of laminitis is increased temperature of the hoof wall, sole, and or coronary band of the foot. It is now well understood that reducing the hoof's temperature (sometimes in combination with anti-inflammatory drugs) has a protective effect. It is therefore desirable to apply cooling devices to the hoof for the treatment of laminitis. Thus, in the case of laminitis, the appropriate therapeutic device is some type of cooling device. However, as one with knowledge of horses will readily appreciate, applying such a therapeutic device and holding it in position is not a simple proposition.

First, a horse is a large and powerful animal that does not like to have foreign objects attached to its hooves. Second, it is generally important for the horse to remain on its feet and moving (albeit likely within a confined area) during the treatment regimen. Thus, any therapeutic device must preferably be very securely fastened to the hoof yet still allow the horse to move freely.

The present invention seeks to provide the desired therapeutic effect by placing one or more therapeutic devices against the hoof. An exemplary therapeutic device is a cold pack configured to remove heat from the affected area. Cold packs are often used for cryo therapy. These are placed on the affected anatomy and held in position using compressive wraps or other known techniques. Some products use ice pellets. "Gel packs" may be substituted for the ice in some applications. Another less common approach is the use of cooled fluid (often water) circulated through a sealed bladder which is placed in contact with the affected area.

The use of gel packs in cryo therapy has several known disadvantages. Gel packs do not undergo a phase change when they are removed from the freezer and placed on the animal. They may initially be well below 0 degrees Celsius and may produce frostbite if placed directly against living tissue. As a result, gel packs must often be separated from living tissue by a layer of appropriately insulating material. Thus, it is often necessary to use an insulating layer which provides some (but not too much) insulation.

In addition, gel packs have a fairly limited heat absorption capacity. Since a phase change does not occur during use, the absorption is based on the increase in the temperature of the gel material itself. As those skilled in the art will know, a phase change typically produces a five-fold increase in heat absorption per unit mass.

Some cooling packs use ice, introducing other known disadvantages. Ice packs often freeze together into aggregated clumps, making them difficult to apply to curved surfaces. In addition, both the conventional ice packs and the gel packs are difficult to remove and replace. Such packs must be frequently exchanged for fresh ones in order to make the cryo therapy effective. One set of packs is typically applied while one or more other sets of packs are cooling in a nearby freezer. The packs must be exchanged for new ones once they reach an ineffective temperature (typically about 5-12 degrees Celsius). This process is made more difficult when the objective is applying the pack to a horse's hoof, where frequent changes are obviously undesirable.

The present invention is able to position and retain practically any desired therapeutic device, including a cold pack containing a suitable cooling medium. The preferred cooling medium is one that freezes between about minus 5 degrees Celsius and about +5 degrees Celsius. Such a medium can absorb considerable heat via the phase change from a solid to a liquid. In addition, such a cooling medium poses little risk of tissue damage (as it will remain at its melting temperature until all the medium has transitioned from a solid to a liquid).

The solid phase of the cooling medium is also significant. It is obviously undesirable for a bag of liquid cooling medium to freeze into a solid block. Rather, it is desirable to have a relatively soft and malleable consistency so that the pack may be bent around the contours of the affected anatomy. It is therefore preferable to have the phase change transition into a highly structured crystalline form akin to snow. The bag of frozen cooling medium will then be soft and malleable. It will also maintain a surface contact temperature between about 0 degrees and 5 degrees Celsius.

A valve must generally be included within the enclosing bag for such a medium. This valve admits ambient air as the crystalline structure forms and the bag expands. The valve is configured to allow air to escape when the crystalline structure melts, without allowing the escape of the liquid contents. A cold pack based on such a highly-crystalline structure is able to absorb more than 5 times the heat transfer of a gel pack.

The reader should bear in mind throughout this disclosure that the present invention can be used with heat packs as well as cold packs. Although some known disadvantages of prior art gel packs have been described, the invention may also be used with gel packs. Laminitis has been presented as an example of a condition requiring cold therapy. Other conditions—such as inflammation of the connective tissues within the horse's lower leg—may suggest the need for heat therapy. Still other conditions may suggest the need for other therapeutic devices such as ultrasonic transducers. Thus, the invention is designed to secure any desired type of therapeutic device against an animal's lower leg and hoof region.

BRIEF SUMMARY OF THE PRESENT INVENTION

The present invention comprises a modular lower leg and hoof wrap configured to hold one or more therapeutic devices proximate an animal's hoof. The invention is intended primarily for use with horses. The components attach to a sole, which is intended to be positioned beneath the animal's hoof. One or more retention panels extend upward from the sole. A first wrap panel and a second wrap panel also extend upward form the sole. Elastic and VELCRO attachment features are preferably used so that each of the components may be positioned in a suitable location for a particular animal's anatomy. Other closure devices, such as buckles or snaps, could also be used.

Each therapeutic device(s) is configured to attach to an inward facing surface of a retention panel. In use, the sole is placed beneath the animal's hoof One or more therapeutic devices are placed against the hoof and/or adjacent structures. The one or more retention panels are then pressed over the therapeutic devices and secured in position (Alternatively, the therapeutic devices may be secured to the retention panels and the devices and panels then simultaneously pressed against the hoof and adjacent structures).

The first (preferably posterior) wrap panel is then wrapped around the posterior portions of the retention panel/therapeutic device assembly and secured in place. The second (preferably anterior) wrap panel is wrapped around the anterior portions of the retention panel/therapeutic device assembly and secured to the first wrap panel. The ordering of securing the panels in place is optional and may be reversed. The combination of the sole, the retention panel(s), and the wrap panel(s) secures the one or more therapeutic devices to the hoof and hold the entire assembly in place so that the animal can move about without dislodging it.

Figure 1:
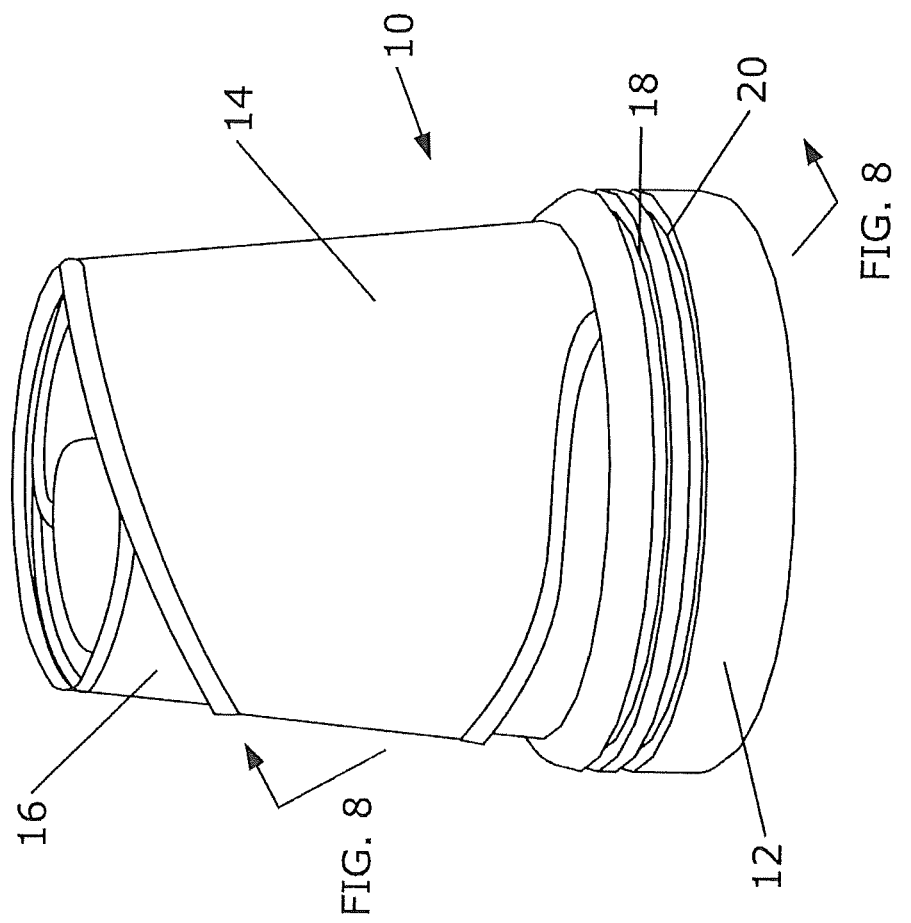
FIG. 1 is a perspective view, showing a complete hoof wrap as it would be placed around a hoof.

REFERENCE NUMERALS IN THE DRAWINGS 10 hoof wrap
12 sole
14 anterior wrap panel
16 posterior wrap panel
18 upper stitching slot
20 lower stitching slot
22 inclined toe
23 contact surface
24 tread pattern 26 wall
28 base
30 left retention panel
32 right retention panel
34 rear retention panel
36 hook tab
37 hook tab
38 hook tab
40 hook tab
42 hook tab
44 hook tab
46 hook tab
48 hook tab
50 hook tab
52 therapeutic device
54 filler material
56 perimeter seal
58 hook panel
60 stitching
62 pastern
64 cannon

DETAILED DESCRIPTION OF THE INVENTION

FIG. 1 shows the present invention 13 hoof wrap 10—in an assembled state. The hoof wrap includes several adjustable panels that connect together. The variable overlap and elastic properties of the panels may be used to adapt the invention to differing hoof anatomy. The configuration in FIG. 1 represents the invention as it would appear when wrapped around a horse's hoof, though the hoof itself has been omitted for purposes of visual clarity.

Sole 12 lies beneath the horse's hoof and provides a "foundation" for the structure. The sole is preferably made of a tough but flexible material, such as natural or synthetic rubber. The downward-facing surface of the sole preferably includes no-skid features such as found on the sole of boots.

A first wrap panel extends upward from the sole and wraps around a first portion of the hoof when installed. A second wrap panel extends upward from the sole and wraps around a second portion of the hoof. In the embodiment shown the first wrap panel is posterior wrap panel 16 configured to wrap around the posterior portion of the hoof. In the same embodiment anterior wrap panel 14 is configured to wrap around the anterior portion of the hoof. In other embodiments the two wrap panels may be configured as left and right lateral panels.

Portions of the two wrap panels overlap so that they can be connected together. In the preferred embodiments, VELCRO attachments are used to that the two wrap panels can be fastened in a wide variety of overlapping states. In addition, one or both of the wrap panels may be made using elastic material so that they can be stretched to a desired degree. This stretching feature allows them to conform to varying hoof anatomy and to provide inward compressive force.

Contained within the connected wrap panels are one or more retention panels. These are used to secure one or more therapeutic devices (such as thermal packs or ultrasonic transducers) in a desired position relative to the animal's anatomy. The various panels are preferably secured to sole 12 by stitching. Upper stitching slot 18 and lower stitching slot 20 are provided in the sole to accommodate the stitched connections.

Those skilled in the art will appreciate that by stretching and securing the posterior wrap panel and the anterior wrap panel together, the components contained within the wrap panels are pressed inward. This facilitates the retention of the therapeutic device(s) against the desired portion of the horse's anatomy. The reader will also appreciate that the anterior and posterior wrap panels could be made as a single panel having an adjustment break in the circumference. However, the use of two panels with two adjustment breaks allows greater flexibility and ease of installation—as will be explained.

Figure 2:
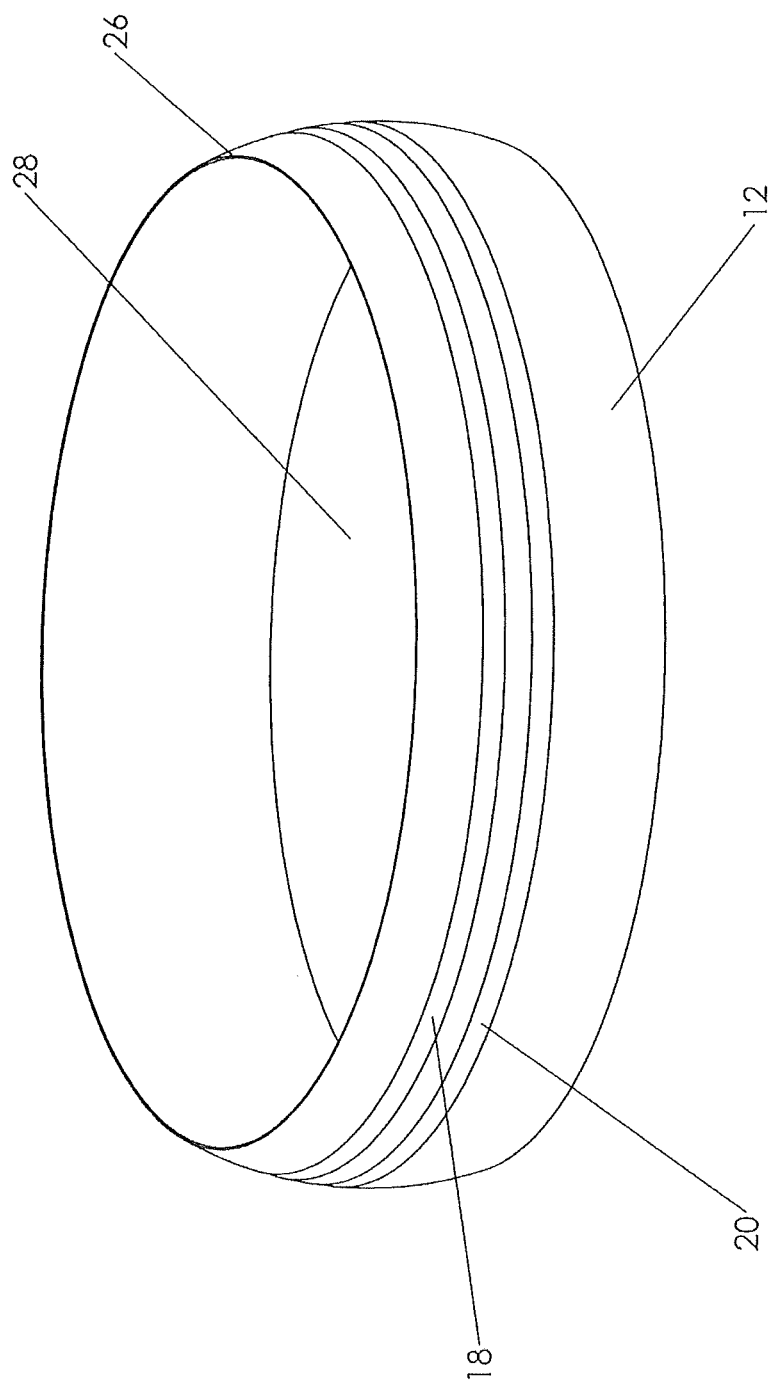
FIG. 2 is a perspective view, showing an exemplary sole used in the modular hoof wrap.

Having described the invention in an assembled state, the component parts will now be described in more detail. FIG. 2 shows sole 12 by itself. Base 28 lies directly beneath the hoof. Wall 26 extends upward from base 28 and surrounds the hoof. The wall retains the sole in the proper position by surrounding the hoof.

Figure 3:
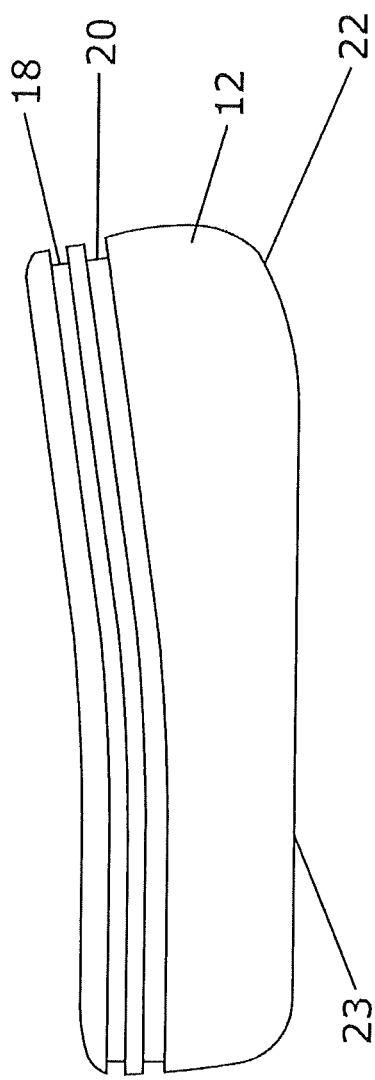
FIG. 3 is a side elevation view, showing the exemplary sole of FIG. 2.
Figure 4:
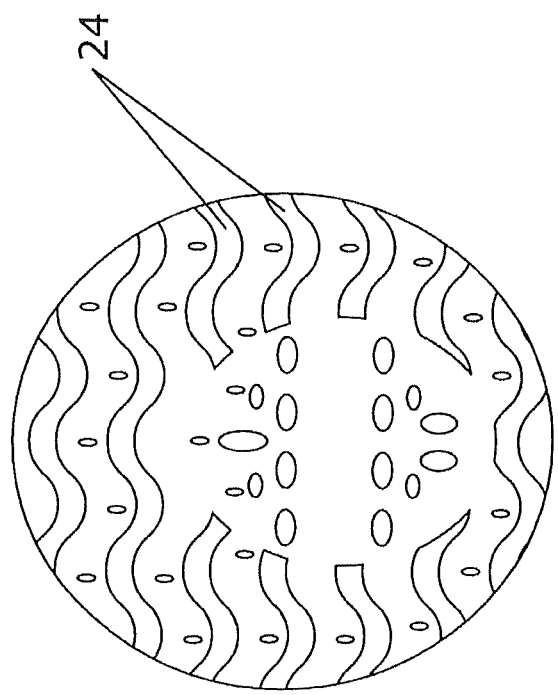
FIG. 4 is a bottom view, showing an exemplary tread pattern that may be used on the bottom surface of the sole.

FIG. 3 shows a side elevation view of sole 12. In this embodiment contact surface 23 is generally planar, but preferably includes inclined toe 22 (an upward sloping portion near the front of the sole). This shape facilitates the horse's normal walking motion. FIG. 4 is a bottom view of the sole. Tread pattern 24 may include alternating ribs and valleys to improve skid-resistance. The tread pattern shown is one example of many different possibilities.

Figure 5:
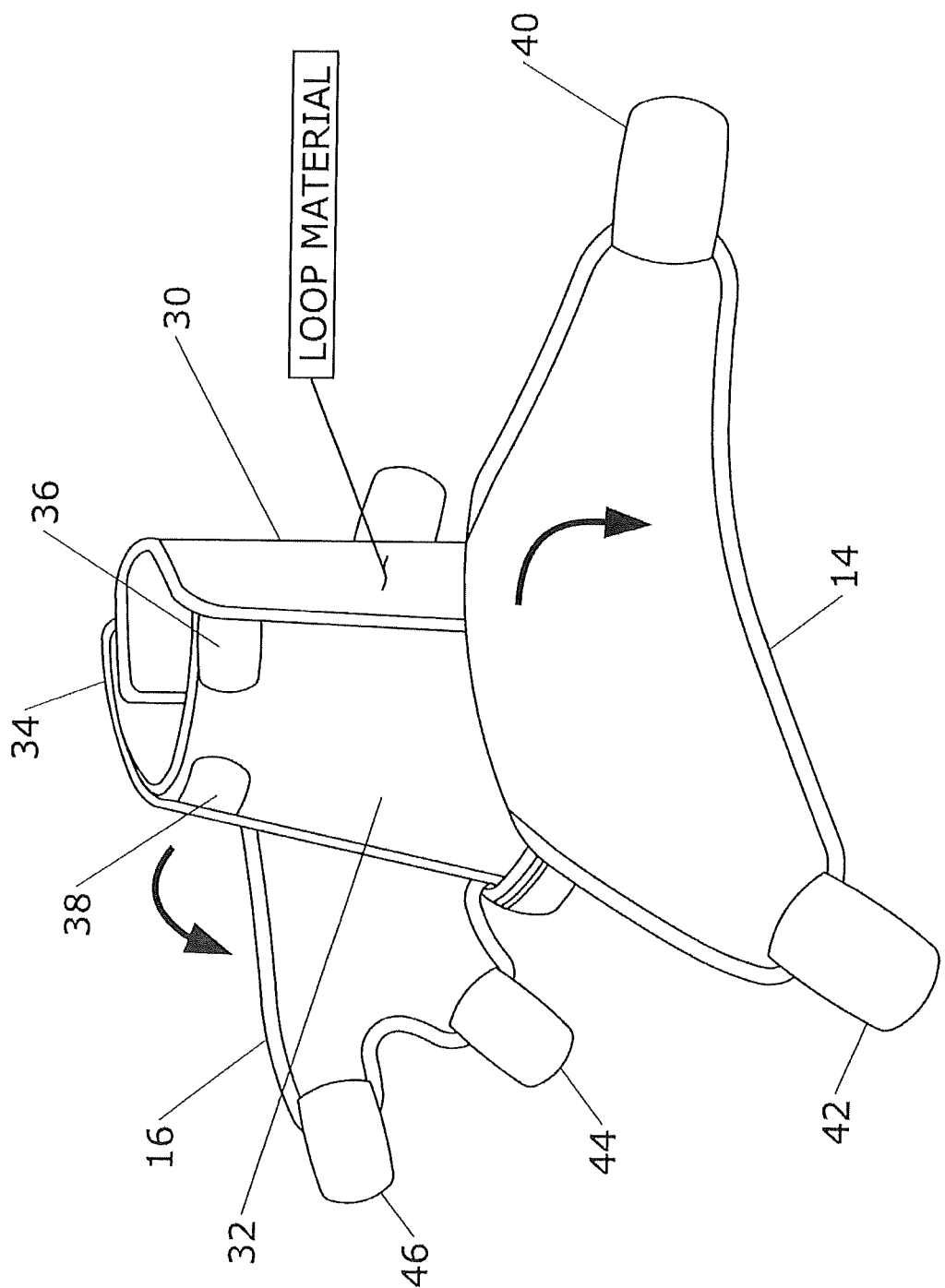
FIG. 5 is a perspective view, showing the retention panels raised and secured together while the anterior and posterior wrap panels remain unsecured.
Figure 8:
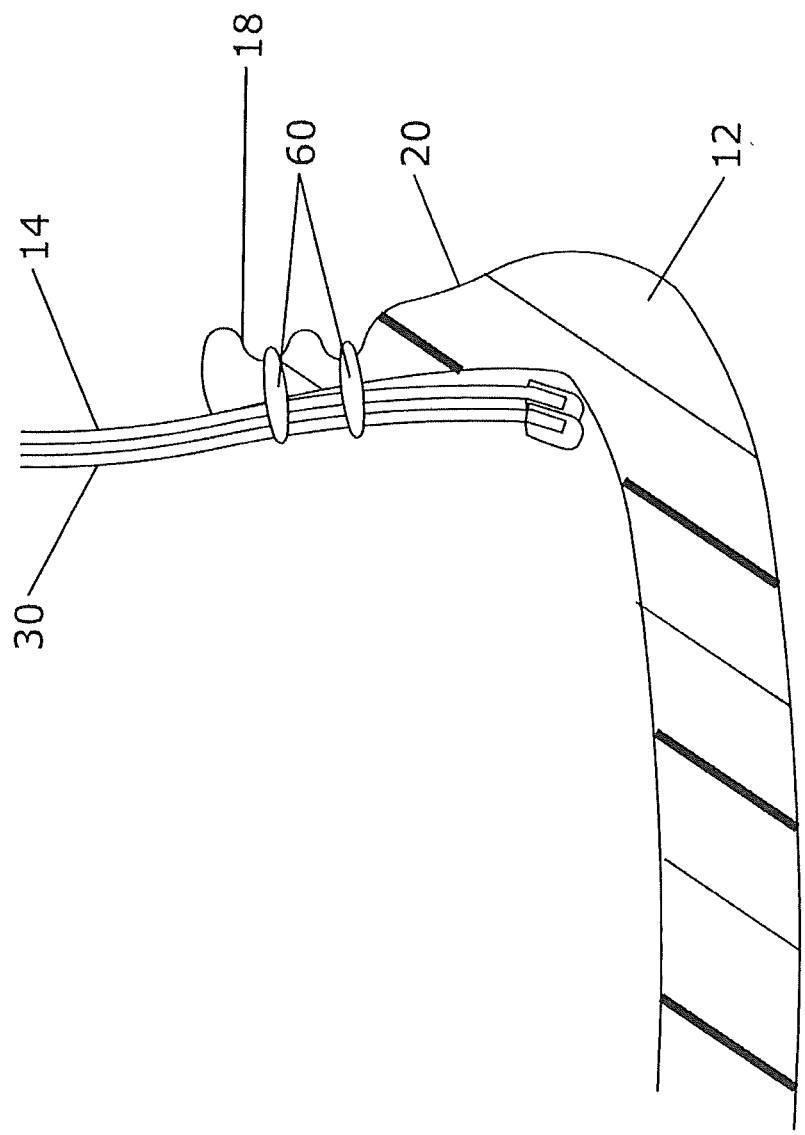
FIG. 8 is a detailed section view, showing one method of attaching the panels to the sole.

FIG. 5 is a perspective view of the invention in an assembled state. In this embodiment three retention panels are used—left retention panel 30, right retention panel 32, and rear retention panel 34. The lower portion of each of these panels is attached to the sole. Likewise, the lower portion of anterior wrap panel 14 and posterior wrap panel 16 are attached to the sole. FIG. 8 shows a sectional elevation view depicting one way of attaching the flexible panels to the sole. Anterior wrap panel 14 and left retention panel 30 are connected to sole 12 by running stitching 60 through both panels and through a portion of the sole. The stitching is made in the two stitching slots 18, 20.

In FIG. 5, the anterior and posterior wrap panels have been folded down flat. The three retention panels 32, 34, 36 are raised into the position they normal occupy when the invention is placed on a horse's hoof.

In the version shown, VELCRO loop material covers the interior and exterior of each of the retention panels. VELCRO hook tabs are also provided on the retention panels. In this example, hook tab 36 on left retention panel 30 has been pressed against the loop material on right retention panel 32. Hook tab 38 connected to rear retention panel 34 has also been pressed against the loop material on right retention panel 32. The hook tabs may be provided in various locations. The objective is to provide a secure encircling structure as shown (for an embodiment using multiple retention panels). Once the encircling structure is created, the majority of the outward facing surfaces are covered in VELCRO loop material.

Hook tabs are preferably provided on the anterior and posterior wrap panels as well. These are positioned to engage the loop material on the outward facing surfaces of the retention panels and/or the loop material on the outward facing surfaces of the retention panels. Anterior wrap panel 14 has two hook tabs 40, 42 (one on each of its upper lateral extremes). Posterior wrap panel 16 actually has four hook tabs in the embodiment shown. Only two of these —44, 46—are clearly visible in FIG. 5.

Figure 6:
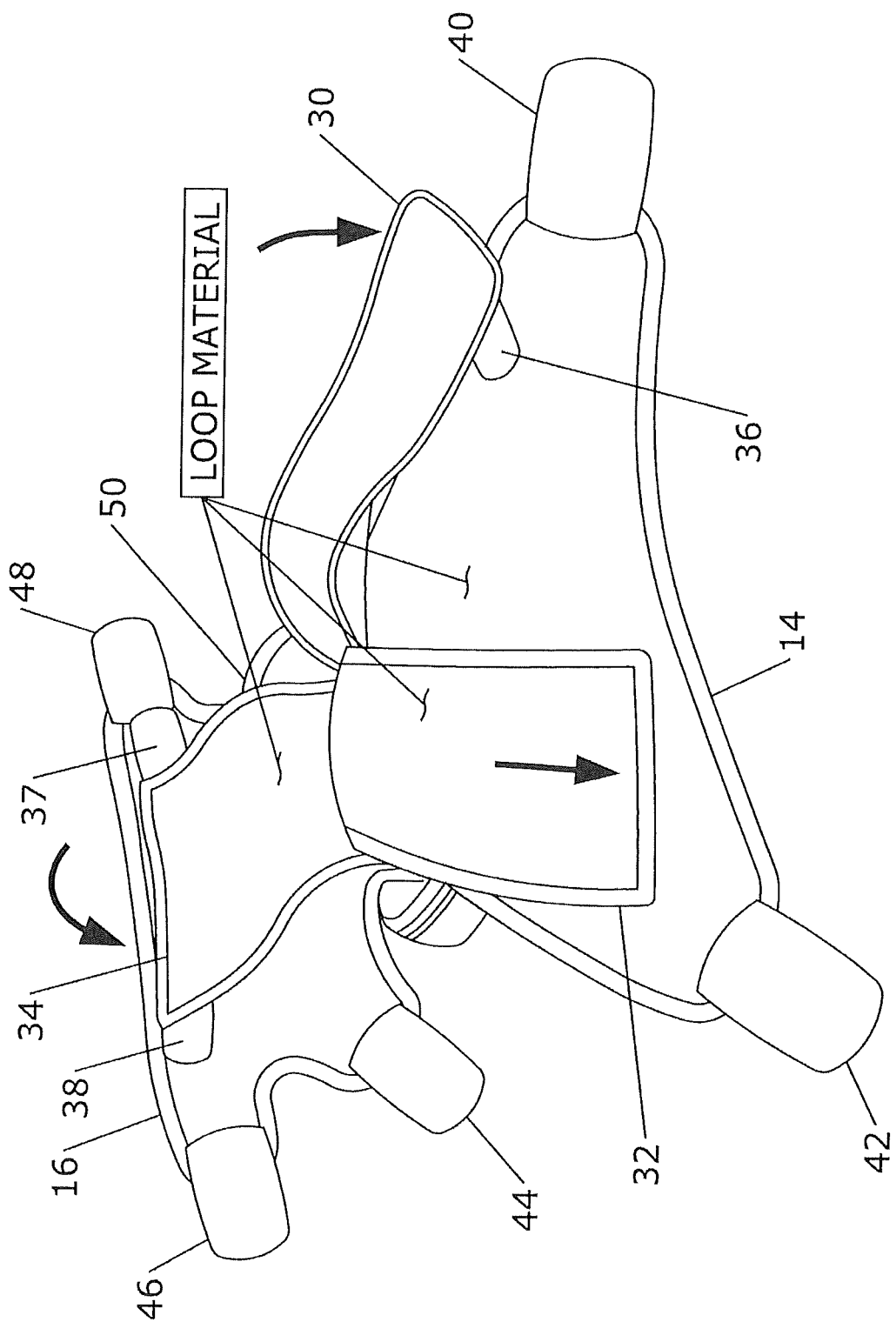
FIG. 6 is a perspective view, showing the configuration of FIG. 5 with the retention panels opened and laid flat.

FIG. 6 shows the same assembly after the three retention panels 30, 32, 24 have been disconnected from each other and folded down flat. In this view all four hook tabs 44, 46, 48, 50 on posterior wrap panel 16 are visible. The reader will also note that rear retention panel 34 in this example has two hook tabs 37, 38. In order to create the encircling assembly of the three retention panels used in this embodiment, the following would be done (in no particular order): (1) hook tab 36 is pressed into the outward facing loop surface of right retention panel 32; (2) hook tab 38 is pressed into the outward facing surface of right retention panel 32; and (3) hook tab 37 is pressed into the outward facing surface of left retention panel 30.

Figure 7:
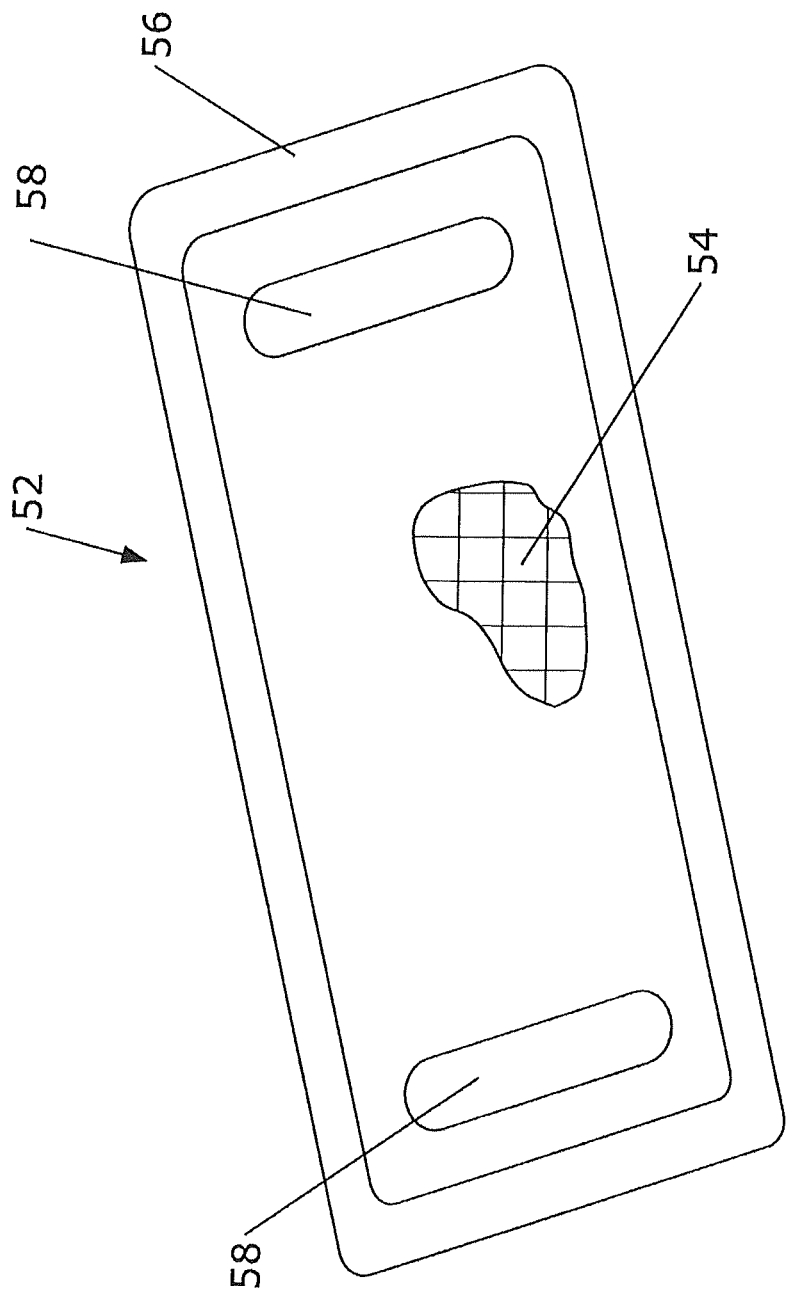
FIG. 7 is a perspective view with a cutaway, showing a heat transfer pack (in this case a cold pack).

The reader will observe in the example of FIG. 6 how the inward facing surfaces of the three retention panels 30, 32, 34 are covered in VELCRO loop material. This facilitates the attachment of the desired therapeutic device(s). FIG. 7 shows an exemplary therapeutic device. Therapeutic device 52 is in this instance a cold pack intended to extract heat from the animal and thereby cool a selected region. Perimeter seal 56 runs around the pack and creates a sealed internal volume. The cutaway shows the contents of the internal volume.

In this preferred embodiment, a cooling media is provided within the cold pack (filler material 54). This cooling media forms a highly crystalline structure akin to snow. It preferably freezes into this structure near the freeing point of water. An expansion valve is included in the cold pack (not shown) so that as the cooling media freezes and expands into a crystalline structure a significant volume of air is drawn into the pack. The result is that the pack "inflates" into a soft and malleable object.

When placed against an affected area needing cooling, the frozen cooling media is transitioned slowly into a liquid. The phase change allows each cold pack to absorb substantially more heat transfer than a simple warming operation (as is the case with gel packs).

The surface of therapeutic device 52 facing the viewer is provided with a pair of VELCRO hook panels in this example. These facilitate the connection of the cold pack to the inward facing surface of one of the retention panels. Returning to FIG. 6, the reader will observe how the inward facing surfaces of the three retention panels 30, 32, 34 (actually facing upward in the view) are covered with VELCRO loop material. The hook panels on an individual therapeutic device 52 can be pressed against this loop material to secure an individual cold pack to an individual retention panel.

Figure 9:
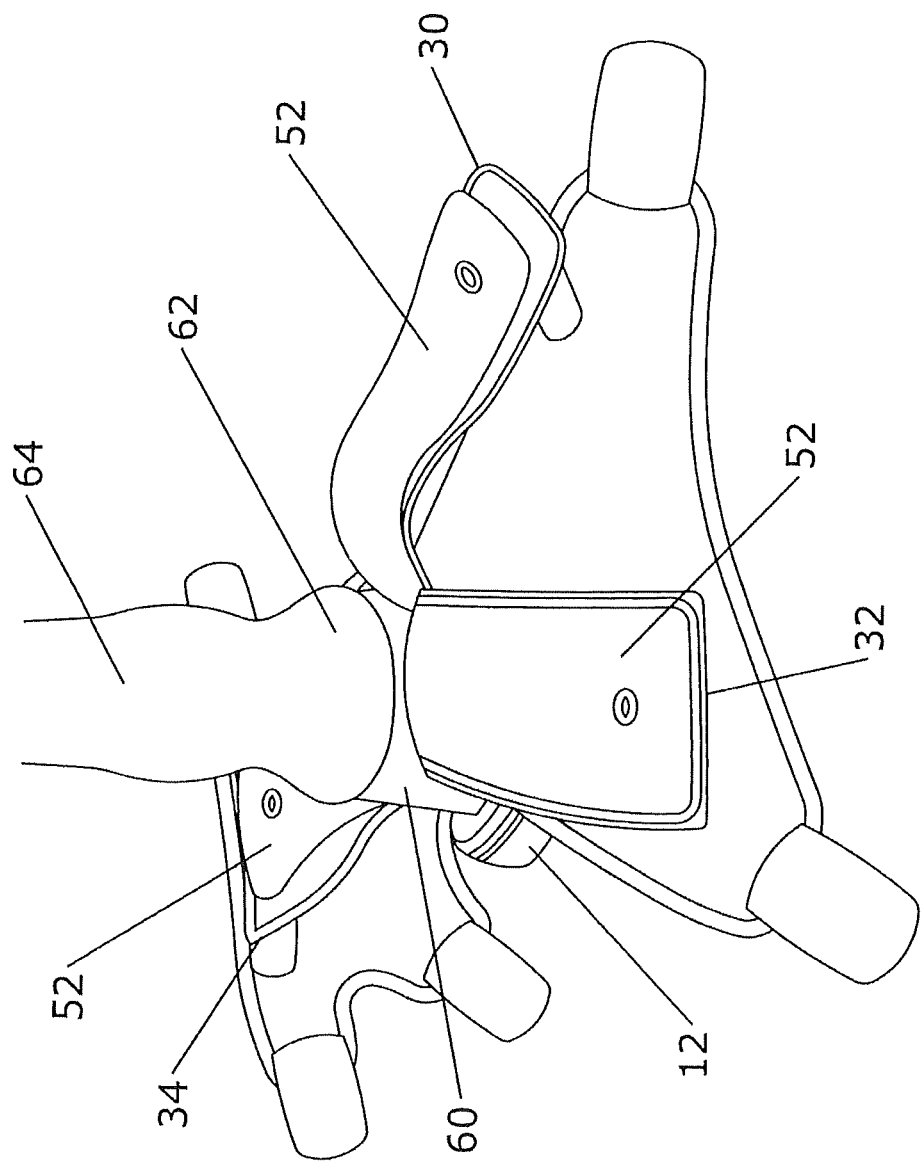
FIG. 9 is a perspective view, showing the invention being applied to the hoof and lower leg of a horse.

FIGS. 9-12 show the application of the invention to a horse's hoof and lower leg structure. In FIG. 9, sole 12 is centered under the hoof and the horse may then place its weight on the sole and remain standing (The invention can also be attached with the hoof lifted free of the ground). All the panels are laid open—the two wrap panels and the three retention panels. A therapeutic device 52 is attached to each of the retention panels 30, 32, 34 by pressing the VELCRO hook panels on each therapeutic device (cold pack) against the loop material on the inward facing surfaces of the retention panels. The sole is sized so that the lower portion of each cold pack can be slipped into the gap between the hoof and the upstanding wall portion of the sole.

Because of variations in size from horse to horse, it may be necessary to provide the invention in differing overall sizes. The invention may also be provided in differing overall heights. The embodiment shown is sized to fit up and over pastern 62 and extend all the way to the vicinity of cannon 64. Other variations may be shorter or taller.

Figure 10:
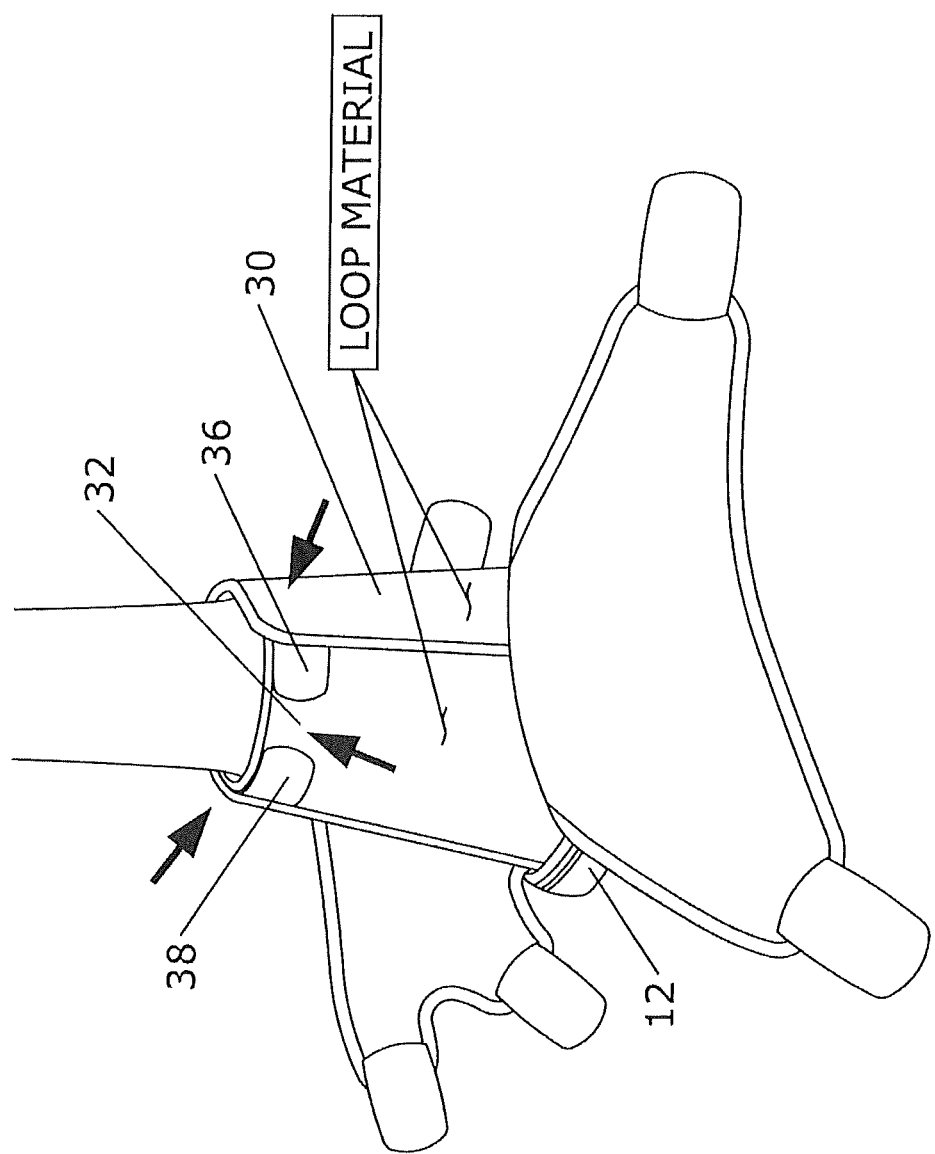
FIG. 10 is a perspective view, showing the assembly of FIG. 9 with the retention panels secured in place.

In FIG. 10 the three retention panels 30, 32, and 34 have been raised to an upright position, thereby encircling the hoof and lower leg structure. Hook tabs 36 and 38 are pressed against the loop material on right retention panel 32. Hook tab 37 (not visible in the view) on rear retention panel 34 is also pressed against the loop material on left retention panel 30. The three therapeutic devices (cold packs) are thereby pressed against the horse's hoof.

Figure 11:
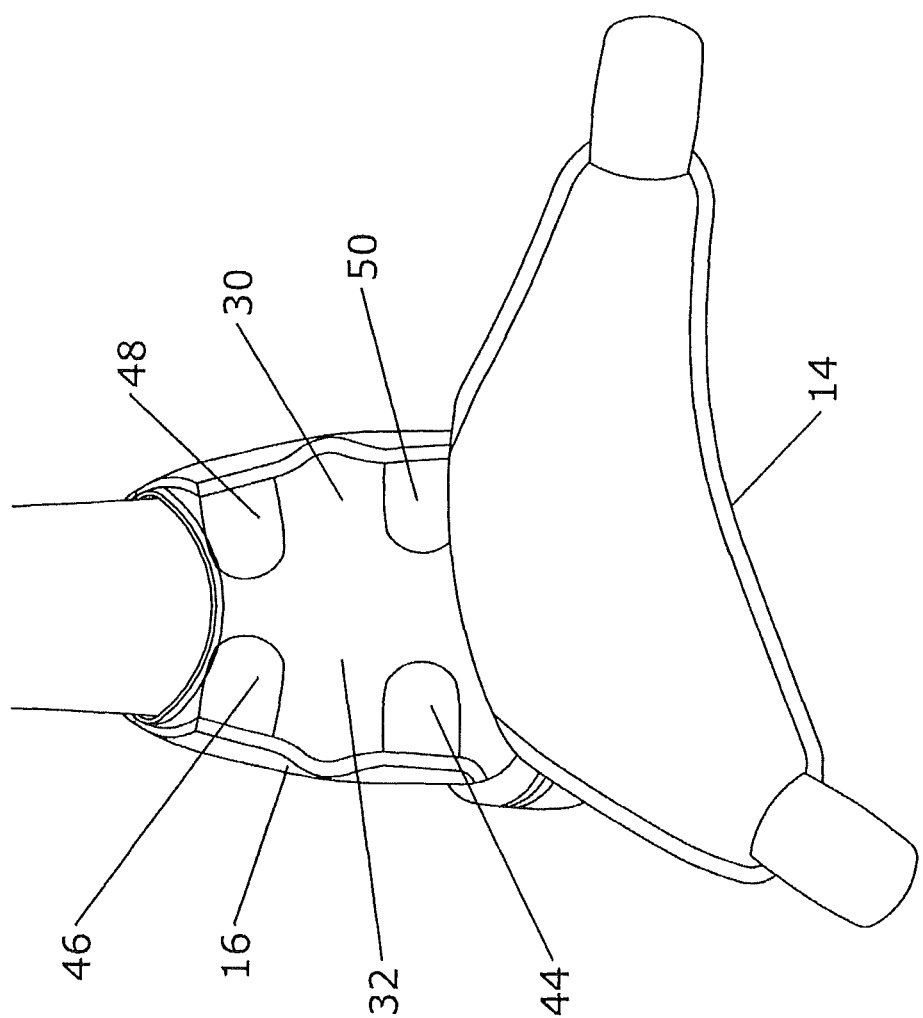
FIG. 11 is a perspective view, showing the assembly of FIG. 10 with the posterior wrap panel secured.

It is desirable to further secure the invention in place and provide additional inward compressive force. The two wrap panels are configured to provide these features. In FIG. 11, posterior wrap panel 16 is raised and wrapped around the posterior portion of the assembly. Its four hook tabs 44, 46, 48, 50 are pressed against the loop material on the retention panels in order to secure the posterior wrap panel in place. The posterior wrap panel is preferably made of elastic material so that it can be pulled and stretched before pressing the hook tabs into position. Anterior wrap panel is then ready to complete the process.

Figure 12:
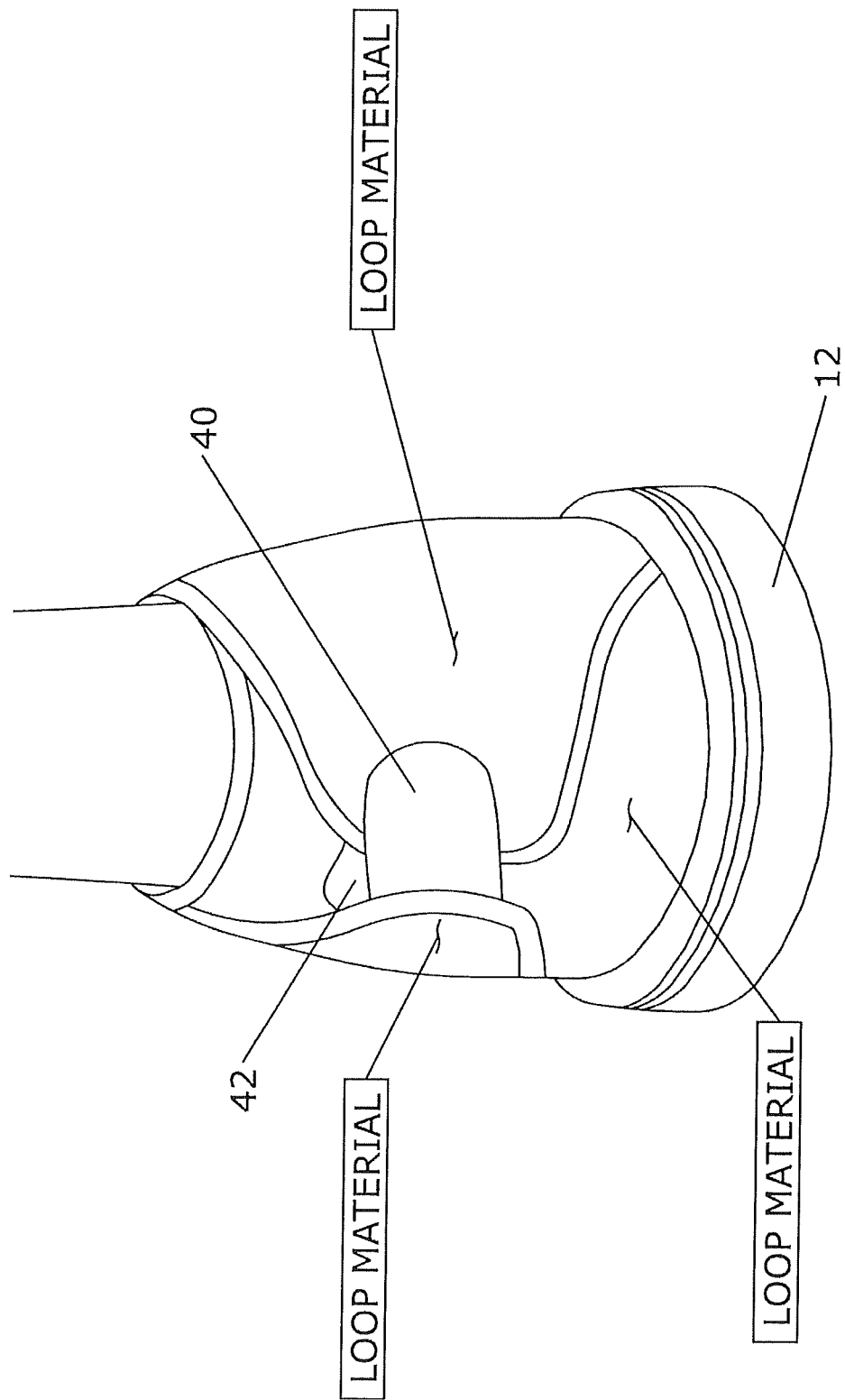
FIG. 12 is a perspective view, showing the completion of the attachment of the invention by securing the anterior wrap panel.

In the view of FIG. 11, anterior wrap panel 14 is lifted upward and its two upper lateral extremes are passed around the assembly. FIG. 12 shows a view of the same assembly from the rear. Anterior wrap panel has been pulled into position. One hook tab 42 has been secured to the loop material on the retention panels. The other hook tab 40 has been secured to the loop material on the outward facing surface of anterior wrap panel 14 itself. As for the posterior wrap panel, the anterior wrap panel is preferably made of elastic material so that it can be stretched into a desired position prior to affixing the hook tabs. The combination of the two wrap panels thereby provides a high-adjustable amount of inward compressive force. This inward compressive force tends to retain the assembly on the horse's hoof while also compressing the cold packs themselves against the area needing cooling.

The reader should bear in mind that other embodiments may not configure the first and second wrap panels in an anterior/posterior configuration. For instance, one could also configure them in a left lateral and right lateral configuration. One could also position the wrap panels at an intermediation position around the circumference of the sole. All these variations are within the scope of the invention, as well as other variations.

When the therapeutic device being applied is either hot or cold therapy, it is necessary to periodically replace the heat transfer packs. A fresh set of packs will usually be swapped for the ones already on the animal. The process described for FIGS. 9-12 is simply reversed to expose the packs (The state shown in FIG. 9). The old packs are pulled free and new packs are pressed into position. The device is then closed back around the hoof and lower leg as described previously.

The exemplary embodiments described preferably include one or more of the following features:

1. The sole is made of a high-friction substance that limits slip between the sole and the ground and limits slip between the hoof and the sole;

2. The sole is made of a pliable material so that it conforms to the shape of the horse's hoof and does not produce undue pressure concentrations on the horse's hoof;

3. The retention panels are configured to accept multiple therapeutic devices and possibly multiple different types of therapeutic devices. With this configuration the same inventive wrap can be used to apply different types of therapeutic devices;

4. The wrap panels can be stretched in order to conform to variations in hoof geometry and to provide a variation in the amount of compressive force provided;

5. The use of VELCRO hook and loop attachments allow many variations in the shape of the closed structure.

In addition, alternate embodiments could include the following features:

1. The therapeutic devices could include hot packs in addition to cold packs, with the hot packs adding heat to a desired area rather than extracting heat from it;

2. Buckle fasteners could be used instead of VELCRO;

3. Snap fasteners could be used instead of VELCRO;

4. Zippers could be used instead of single-point fasteners;

5. Some of the panels could be made from inelastic material;

6. An outer layer of abrasion-resistant material could be used;

7. A circulation-based heating or cooling system could be used in which a liquid cooling media is pumped through a jacket contained within the retention panels;

8. The therapeutic devices could include ultrasonic transducers, trans-dermal medication packs, magnetic devices, light-based devices, and other types of devices.

Although the preceding descriptions present considerable detail they should be properly viewed as illustrating embodiments of the present invention rather than limiting the scope of the invention. Many more embodiments following the same principles will occur to those skilled n the art. As an example, the actual panel configuration used to create the inventive hoof wrap could be altered in many ways. Accordingly, the scope of the invention should be fixed by the following claims rather than by the examples given.

Having described our invention, we claim:

1. A method of applying thermal therapy to an animal's hoof, pastern, and cannon, said hoof including a hoof sole, comprising:
   (a) providing a hoof wrap including,
      (i) a sole having a base configured to lie beneath said hoof sole, said base having a perimeter, said sole having a wall extending upward from said base around said perimeter, with said wall and said base combining to create a cavity configured to receive a lower portion of said hoof,
      (ii) said wall having an inward facing surface,
      (iii) a plurality of flexible retention panels extending upward from said sole, with a lower portion of each of said retention panels being joined to said sole and lying proximate said inward facing surface of said wall,
      (iv) an inward-facing side of each of said retention panels being covered in hook-and-loop material,
      (v) an anterior wrap panel made of elastic material extending upward from said sole, with a lower portion of said anterior wrap panel being joined to said sole,
      (vi) a posterior wrap panel made of elastic material extending upward from said sole, with a lower portion of said posterior wrap panel being joined to said sole;
   (b) providing a cold pack, having a hook-and-loop panel;
   (c) placing said animal's hoof on said sole with said wall of said sole surrounding said lower portion of said hoof;
   (d) attaching said cold pack to one of said retention panels by pressing said hook-and-loop panel on said cold pack against said hook-and-loop covering on said retention panels;
   (e) raising said retention panels upward and linking them together so that they encircle said hoof, pastern and cannon, with said cold pack being trapped between said linked retention panels and said hoof, pastern, and cannon in a stable configuration;
   (f) raising said posterior wrap panel and stretching said posterior wrap panel before securing said posterior wrap panel to said encircled retention panels; and
   (g) raising said anterior wrap panel and stretching said anterior wrap panel before securing said anterior wrap panel to said posterior wrap panel.

2. The method of applying thermal therapy as recited in claim 1, wherein:
   (a) outward facing surfaces of said retention panels are covered in loop material;
   (b) said posterior wrap panel is provided with an upper right lateral hook tab and an upper left lateral hook tab; and
   (c) said posterior wrap panel is secured to said encircled retention panels by pulling and stretching said posterior wrap panel and then pressing said upper right lateral hook tab and said upper left lateral hook tab on said posterior wrap panel against said loop material on said outward facing surfaces of said retention panels.

3. The method of applying thermal therapy as recited in claim 2, wherein:
   (a) an outward facing surface of said posterior wrap panel is covered in loop material;
   (b) said anterior wrap panel is provided with an upper right lateral hook tab and an upper left lateral hook tab; and
   (c) said anterior wrap panel is secured to said posterior wrap panel by pulling and stretching said anterior wrap panel and then pressing said upper right lateral hook tab and said upper left lateral hook tab on said anterior wrap panel against said loop material on said outward facing surfaces of said posterior wrap panel.

4. The method of applying thermal therapy as recited in claim 3 wherein said first wrap panel includes four hook tabs.

5. The method of applying thermal therapy as recited in claim 1, wherein said hoof is standing on said sole while said retention panels, said posterior wrap panel, and said anterior wrap panel are secured in place.

6. The method of applying thermal therapy as recited in claim 1 wherein said base and said wall of said sole are molded as one integral piece.

7. The method of applying thermal therapy as recited in claim 1 wherein said retention panels are linked together using hook-and-loop tabs.

8. The method of applying thermal therapy as recited in claim 1 wherein said posterior wrap panel includes four hook tabs.

9. A method of applying thermal therapy to an animal's hoof, said hoof including a hoof sole, comprising:
   (a) providing a hoof wrap including,
      (i) a sole having a base configured to lie beneath said hoof sole, said base having a perimeter, said sole having a wall extending upward from said base around said perimeter, with said wall and said base combining to create a cavity configured to receive a lower portion of said hoof,
      (ii) said wall having an inward facing surface,
      (iii) a plurality of flexible retention panels extending upward from said sole, with a lower portion of each of said retention panels being joined to said sole and lying proximate said inward facing surface of said wall,
      (iv) an inward-facing side of each of said retention panels being covered in hook-and-loop material, (v) a first wrap panel made of elastic material extending upward from said sole, with a lower portion of said first wrap panel being joined to said sole, (vi) a second wrap panel made of elastic material extending upward from said sole, with a lower portion of said second wrap panel being joined to said sole;

(b) providing a thermal pack, having a hook-and-loop panel;

(c) placing said animal's hoof on said sole with said wall of said sole surrounding said lower portion of said hoof;

(d) attaching said thermal pack to one of said retention panels by pressing said hook-and-loop panel on said thermal pack against said hook-and-loop covering on said retention panels;

(e) raising said retention panels upward and linking them together so that they encircle said hoof with said thermal pack being trapped between said linked retention panels and said hoof;

(f) raising said first wrap panel and stretching said first wrap panel before securing said first wrap panel to said encircled retention panels; and (g) raising said second wrap panel and stretching said second wrap panel before securing said second wrap panel to said first wrap panel.

10. The method of applying thermal therapy as recited in claim 9, wherein:

(a) outward facing surfaces of said retention panels are covered in loop material;

(b) said first wrap panel is provided with an upper right lateral hook tab and an upper left lateral hook tab; and (c) said first wrap panel is secured to said encircled retention panels by pulling and stretching said first wrap panel and then pressing said upper right lateral hook tab and said upper left lateral hook tab on said first wrap panel against said loop material on said outward facing surfaces of said retention panels.

11. The method of applying thermal therapy as recited in claim 10, wherein:

(a) an outward facing surface of said first wrap panel is covered in loop material;

(b) said second wrap panel is provided with an upper right lateral hook tab and an upper left lateral hook tab; and (c) said second wrap panel is secured to said first wrap panel by pulling and stretching said second wrap panel and then pressing said upper right lateral hook tab and said upper left lateral hook tab on said second wrap panel against said loop material on said outward facing surfaces of said first wrap panel.

12. The method of applying thermal therapy as recited in claim 9, wherein said hoof is standing on said sole while said retention panels, said first wrap panel, and said second wrap panel are secured in place.

13. The method of applying thermal therapy as recited in claim 9 wherein said base and said wall of said sole are molded as one integral piece.

14. The method of applying thermal therapy as recited in claim 9 wherein said retention panels are linked together using hook-and-loop tabs.

15. A method of applying thermal therapy to an animal's hoof, said hoof including a hoof sole, comprising:

(a) providing a hoof wrap including, (i) a sole having a base configured to lie beneath said hoof sole, said base having a perimeter, said sole having a wall extending upward from said base around said perimeter, with said wall and said base combining to create a cavity configured to receive a lower portion of said hoof, (ii) said wall having an inward facing surface, (iii) a plurality of flexible retention panels extending upward from said sole, with a lower portion of each of said retention panels being joined to said sole and lying proximate said inward facing surface of said wall, (iv) an inward-facing side of each of said retention panels being covered in hook-and-loop material, (v) a first wrap panel made of elastic material extending upward from said sole, with a lower portion of said first wrap panel being joined to said sole, (vi) a second wrap panel made of elastic material extending upward from said sole, with a lower portion of said second wrap panel being joined to said sole;

(b) providing a thermal pack, having a hook-and-loop panel;

(c) laying said retention panels and said first and second wrap panels in an open state;

(d) placing said animal's hoof on said sole with said wall of said sole surrounding said lower portion of said hoof;

(e) attaching said thermal pack to one of said retention panels by pressing said hook-and-loop panel on said thermal pack against said hook-and-loop covering on said retention panels;

(f) raising said retention panels upward and linking them together so that they encircle said hoof with said thermal pack being trapped between said linked retention panels and said hoof;

(g) raising said first wrap panel and stretching said first wrap panel before securing said first wrap panel to said encircled retention panels; and (h) raising said second wrap panel and stretching said second wrap panel before securing said second wrap panel to said first wrap panel.

16. The method of applying thermal therapy as recited in claim 15, wherein:

(a) outward facing surfaces of said retention panels are covered in loop material;

(b) said first wrap panel is provided with an upper right lateral hook tab and an upper left lateral hook tab; and (c) said first wrap panel is secured to said encircled retention panels by pulling and stretching said first wrap panel and then pressing said upper right lateral hook tab and said upper left lateral hook tab on said first wrap panel against said loop material on said outward facing surfaces of said retention panels.

17. The method of applying thermal therapy as recited in claim 16, wherein:

(a) an outward facing surface of said first wrap panel is covered in loop material;

(b) said second wrap panel is provided with an upper right lateral hook tab and an upper left lateral hook tab; and (c) said second wrap panel is secured to said first wrap panel by pulling and stretching said second wrap panel and then pressing said upper right lateral hook tab and said upper left lateral hook tab on said second wrap panel against said loop material on said outward facing surfaces of said first wrap panel.

18. The method of applying thermal therapy as recited in claim 15, wherein said hoof is standing on said sole while said retention panels, said first wrap panel, and said second wrap panel are secured in place.

19. The method of applying thermal therapy as recited in claim 15 wherein said base and said wall of said sole are molded as one integral piece.

20. The method of applying thermal therapy as recited in claim 15 wherein said retention panels are linked together using hook-and-loop tabs.

\* \* \* \* \*